United States Patent [19]

Babcock

[11] 3,973,765

[45] Aug. 10, 1976

[54] PIPEFITTER'S JIG

[76] Inventor: John B. Babcock, P.O. Box 167, Minooka, Ill. 60447

[22] Filed: June 2, 1975

[21] Appl. No.: 583,137

Related U.S. Application Data

[63] Continuation of Ser. No. 419,692, Nov. 28, 1973, abandoned.

[52] U.S. Cl. ............................. 269/37; 29/200 P; 269/270; 269/289 R
[51] Int. Cl.² ...................................... B23Q 3/00
[58] Field of Search ..................... 29/200 J, 200 P; 269/37, 41, 43, 45, 152, 155, 270, 289

[56] References Cited

UNITED STATES PATENTS

| 542,541 | 7/1895 | Smith | 269/45 |
| 731,665 | 6/1903 | Clayton | 269/45 |
| 3,086,767 | 4/1963 | Boser | 269/45 |
| 3,718,327 | 2/1973 | Nunez | 269/37 |

FOREIGN PATENTS OR APPLICATIONS

| 32,480 | 5/1966 | Japan | 269/37 |

*Primary Examiner*—Roy Lake
*Assistant Examiner*—Mark S. Bicks

[57] ABSTRACT

A pipefitter's jig for facilitating the coupling of a length of pipe to a pipe fitting comprises a base on which any one of a number of different blocks may be mounted, each block being recessed to conform to the configuration of the fitting and pipe to be coupled. Guide means is carried by the base for supporting a length of pipe in predetermined relation with reference to the pipe fitting and is movable toward and away from the fitting so as to adjust the relative positions of the fitting and the pipe.

3 Claims, 4 Drawing Figures

PIPEFITTER'S JIG

This is a continuation, of application Ser. No. 419,692, filed in the United States Patent Office on November 28, 1973, now abandoned.

The invention disclosed herein relates to a jig that is specially adapted for use in the welding of pipes to pipe fittings of the kind wherein one end of a pipe is fitted into one end of a fitting having a shoulder which limits the extent to which the pipe may be inserted into the fitting.

In the welding of pipes and fittings of the kind described, it is necessary for that end of the pipe which is received within the fitting to be spaced from the shoulder of the fitting so as to avoid cracking or breaking of the weld due to thermal expansion and contraction of the pipe and fitting. The American Society of Mechanical Engineers and the welding codes of most political subdivisions require that at least 1/16 inch clearance between the end of a pipe and the shoulder of a fitting be provided prior to commencing the welding operation, and that the longitudinal axis of the pipe be maintained in alignment with the longitudinal axis of the fitting. Many techniques have been employed by welders in an effort to comply with these requirements. Most of the techniques employed by welders heretofore have necessitated the use of pencils, rulers, levels, squares, and similar devices for determining the size of the clearance gap and for maintaining the axes of the pipes in alignment with the axes of the ends of the fitting. The accuracy of such devices leaves much to be desired and, in the final analysis, the accuracy and acceptability of welded joints using such devices depend almost entirely upon the skill and experience of the pipefitter. Since there are differences in the skill and experience of pipefitters, there inevitably are great differences in workmanship and in the length of time that is required to complete pipefitting operations.

An object of this invention is to provide a jig construction which is capable of automatically providing the desired clearance between a pipe and a shouldered fitting and which maintains coaxial alignment between the pipe and the fitting.

Another object of the invention is to provide a jig of the character described and which is adapted for use with fittings of different configurations.

A further object of the invention is to provide a pipe fitter's jig which is simple in construction and operation.

Other objects and advantages of the invention will be pointed out specifically or will become apparent from the following description when it is considered in conjunction with the appended claims and the accompanying drawings, in which:

Figure 1:
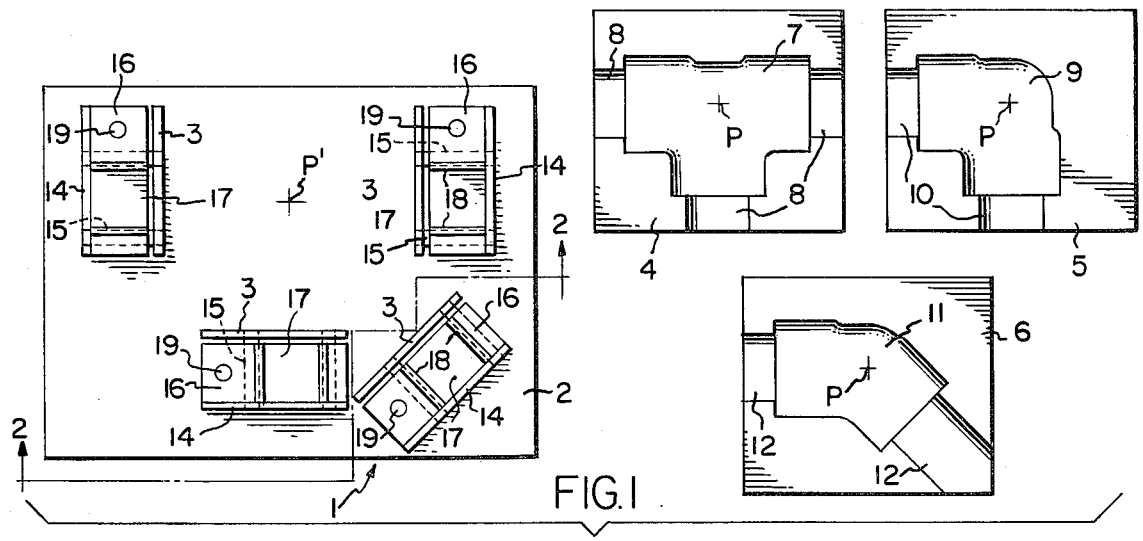
FIG. 1 is a top plan view illustrating a jig constructed in accordance with the invention and also illustrating a plurality of interchangeable blocks forming part of the jig.

A jig constructed in accordance with the invention is designated generally by the reference character 1 and comprises a flat, metal base 2 on which is secured a plurality of spaced apart stops or uprights 3 the spacing of which is such as to enable them to accommodate therebetween and locate any one of a number of different blocks 4, 5, and 6 of uniform size. Each block preferably has a flat bottom, but has a recess in its upper surface to accommodate a particularly shaped fitting and grooves to accommodate the adjacent ends of pipes adapted to be joined to such fitting. Thus, the block 4 has a T-shaped recess 7 and three arcuate grooves 8, the block 5 has a right-angular elbow recess 9 and a pair of arcuate grooves 10, and the block 6 has a 45° elbow recess 11 and a pair of arcuate grooves 12. The recess 7 is adapted to accommodate a tee fitting 13 (FIG. 2), the recess 9 is adapted to accommodate a right-angular elbow fitting (not shown) and the recess 11 and is adapted to accommodate a 45° elbow fitting (not shown). The longitudinal axes of the three grooves 8 intersect at a common point P, as do the longitudinal axes of the pairs of grooves 10 and 12.

Associated with each stop member 3 is a companion stop 14 that parallels but is spaced from the stop 3. Spanning each pair of members 3 and 14 is a pair of bars 15 by means of which a slide 16 is mounted for reciprocable movements between the members 3 and 14. The width of each slide 16 is less than the spacing between the associated members 3 and 14. Preferably, the difference between the spacing of the members 3 and 14 and the width of the slide 16 is 1/8 inch, but it is not less than 1/16 inch.

Each slide 16 has fixed thereto a channel-shaped guide 17 having upstanding flanges 18. The guides 17 are so arranged relatively to one another that the longitudinal axes of all guides extend along lines which intersect at a point P' (FIG. 1).

Each slide 16 has a threaded opening 19 adapted to receive a correspondingly threaded shaft 20 on which pipeclamping means 21 is mounted. Each clamping means 21 is of known contruction and comprises a bar 22 fixed to the shaft 20 and on which is pivoted as at 23 a clamping jaw 24. The jaw 24 also is pivoted as at 25 to an operating lever 26 which in turn is pivoted as at 27 to a link 28 carried by the bar 22. Releasable locking means 29 acts on the link 28 in a known manner to lock the jaw 24 in clamping relation with a length of pipe 30 supported on the associated guide 17.

Figure 2:
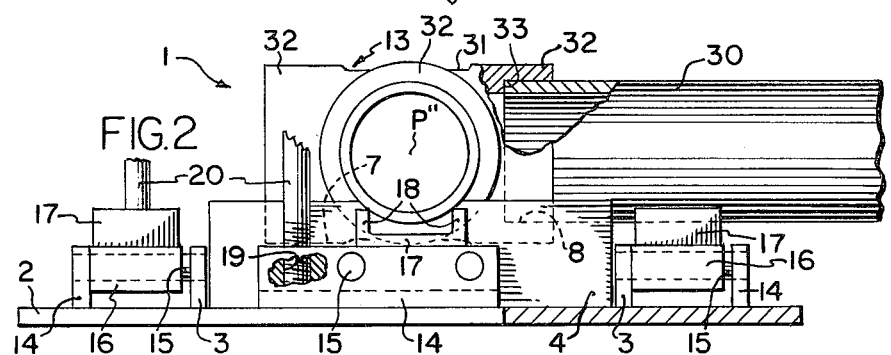
FIG. 2 is a view taken on the line 2—2 of FIG. 1 and illustrating one of the blocks of FIG. 1 supporting a fitting in which is accommodated one end of a length of pipe.
Figure 3:
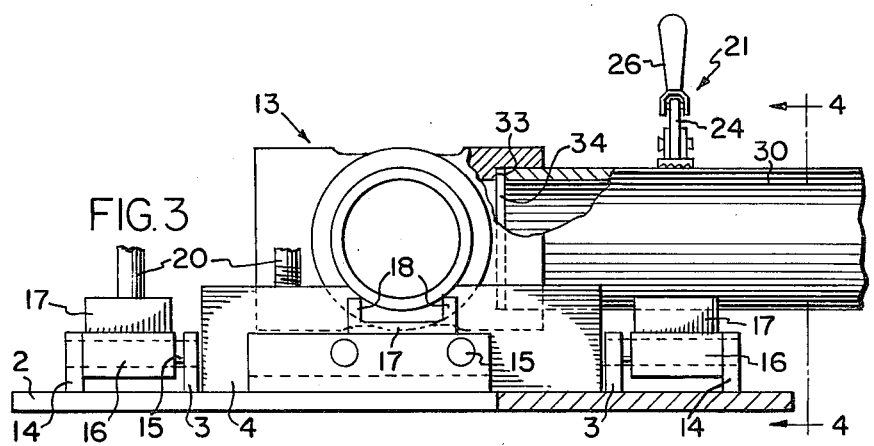
FIG. 3 is a view similar to FIG. 2, but illustrating clamping apparatus supporting the pipe in an adjusted position.
Figure 4:
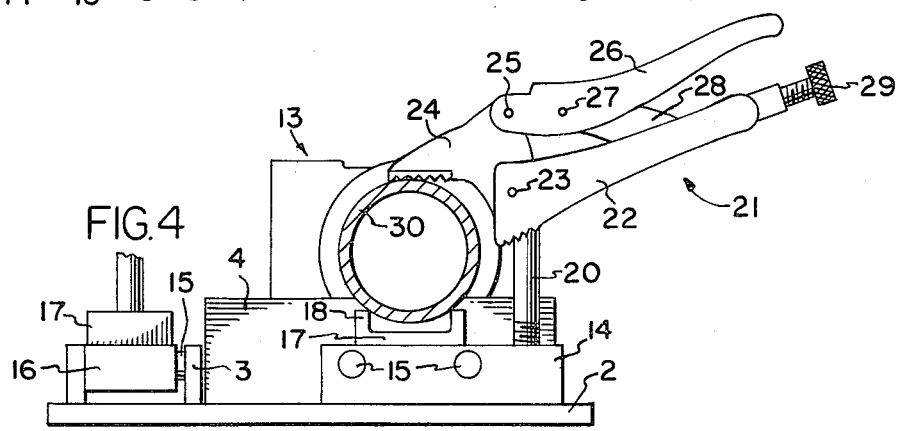
FIG. 4 is a sectional view taken on the line 4—4 of FIG. 3.

The tee fitting 13 shown in FIGS. 2 – 4 is a conventional fitting having a hollow body 31 provided with three open mouth portions 32. Each mouth portion is counterbored to provide a shoulder 33 having a width corresponding substantially to the wall thickness of the pipe 30 and against which the end of the pipe may rest when the pipe is fitted into the mouth 32. Although not shown, the elbow fittings to which reference previously has been made conventionally have shouldered mouth portions at opposite ends of their respective bodies.

To condition the apparatus for operation, and assuming that a tee fitting is to be welded to three intersecting pipes, the block 4 will be assembled with the base 2 in the manner indicated in FIGS. 2 – 4. When the block 4 is assembled with the base, the longitudinal axes of the grooves 8 will lie in the same vertical plane as the longitudinal axes of the guides 17 and the point P' will overlie exactly the point P. The tee fitting 13 then may be introduced to the recess 7. The arrangement is such that the longitudinal axes of the mouth portions 32 of the fitting 13 will overlie exactly the longitudinal axes of the grooves 8 and will intersect at a point P" which overlies exactly the points P and P'.

Following placement of the fitting 13 in the recess 7 a pipe 30 may be placed on the guide 17 of the associated slide and have one end thereof inserted into one mouth portion 32 of the fitting so that the end of the pipe abuts the shoulder 13. The depth of each groove 8 preferably is such as to provide support for that portion of the pipe 30 adjacent the mouth 32 of the fitting. The longitudinal axis of the pipe 30 thus will coincide with the axis of the mouth 32 into which it is fitted. Following insertion of the pipe 30 in the mouth 32 of the fitting, and with the free end of the pipe abutting the shoulder 33, the associated slide 16 may be moved relatively to the pipe toward the fitting 13 so as to abut the stop 3. The associated clamp 21 then may be manipulated so as to clamp the pipe 30 securely between the guide 17 and the jaw 24. Thereafter, the slide 16 may be moved away from the fitting 13 so as to abut the stop 14. During such movement of the slide 16 the pipe 30 will move with the slide, but the end of the recess 7 will maintain the fitting 13 in a fixed position. As a consequence, a gap or clearance 34 (FIG. 3) will be provided between the end of the pipe 30 and the confronting shoulder 33, and such clearance will correspond to the extent of movement of the slide 16. Following the provision of the clearance 34, the pipe 30 and the fitting 13 may be tack-welded to one another so as to maintain them in their adjusted positions.

The operations described for welding the one pipe 30 to the fitting 13 may be repeated for two other pipes that are to be joined to the fitting 13, whereupon the fitting will be joined to three pipes. Following the tack-welding operations, the fitting, together with the associated pipes, may be removed from the jig and the welding completed.

If elbow fittings corresponding to the configuration of the recesses 9 and 11 are to be joined to pipes, the operations heretofore described are equally applicable to such fittings.

The disclosed jig has component parts which are adapted for use with fittings and pipes having one range of diameters. It will be understood that other, identical jigs may be provided for use with fittings and pipes having a different range of diameters.

The disclosed embodiment is representative of a presently preferred form of the invention, but is intended to be illustrative rather than definitive thereof. The invention is defined in the claims.

I claim:

1. Apparatus for facilitating the coupling of a length of pipe in telescoping relation to a pipe fitting having at one end thereof an open mouth for the accommodation of a predetermined length of said pipe, said fitting having an internal shoulder spaced a predetermined distance inwardly from its open mouth and against which said length of pipe may seat, said apparatus comprising a base establishing a reference point; means carried by said base for supporting said fitting with said one end thereof fixed at a predetermined distance from said reference point; guide means for supporting said pipe in an initial position with one end thereof accommodated in said one end of said fitting and seated on said shoulder; means for fixing said pipe on said guide means when said pipe is in said initial position; means mounting said guide means on said base for free sliding movement in a direction away from said fitting supporting means whereby said one end of said pipe may be moved from said initial position outwardly of said fitting and out of engagement with said shoulder; and a stop member carried by said base at a second and greater predetermined distance from said reference point, said stop member being located in a path of movement of said guide means in said direction and being engageable by said guide means, said stop member being so positioned on said base that the maximum distance said guide means may move in said direction is less than the distance from said shoulder to said open mouth of said fitting.

2. Apparatus according to claim 1 wherein said supporting means comprises a block mounted on said base, said block having a recess therein corresponding to the configuration of the fitting.

3. Apparatus according to claim 2 wherein said block also has a recess therein corresponding to the configuration of said pipe length.

* * * * *